United States Patent
Hattori et al.

(10) Patent No.: US 6,602,957 B2
(45) Date of Patent: Aug. 5, 2003

(54) THERMOPLASTIC ELASTOMER COMPOSITION AND RUBBER ROLLER COMPOSED THEREOF

(75) Inventors: Takayuki Hattori, Kobe (JP); Tetsuo Mizoguchi, Kobe (JP); Yoshihisa Mizumoto, Kobe (JP); Hideyuki Okuyama, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 0 days.

(21) Appl. No.: 10/253,520

(22) Filed: Sep. 25, 2002

(65) Prior Publication Data

US 2003/0060566 A1 Mar. 27, 2003

Related U.S. Application Data

(62) Division of application No. 09/862,701, filed on May 23, 2001, now Pat. No. 6,476,140.

(30) Foreign Application Priority Data

Jun. 1, 2000 (JP) .......................... 2000-164347
Aug. 25, 2000 (JP) .......................... 2000-255680

(51) Int. Cl.$^7$ ............... C08L 21/00; C08J 5/00; C08K 5/00; B65H 5/06; B65H 27/00
(52) U.S. Cl. ............... 525/191; 525/213; 525/222; 525/232; 525/238; 525/240; 525/245
(58) Field of Search ................. 525/191, 213, 525/222, 232, 238, 240, 241; 425/223, 263

(56) References Cited

U.S. PATENT DOCUMENTS 3,981,342 A * 9/1976 Farber et al. ............... 152/504
5,349,005 A    9/1994 Tanaka
5,621,045 A * 4/1997 Patel et al. ............... 525/237
6,184,295 B1 * 2/2001 Okuyama ............... 525/192

FOREIGN PATENT DOCUMENTS

| EP | 0 486 700 B1 | 6/1991 |
| JP | 2837741 | 6/1990 |
| JP | 04-063850 | 6/1990 |

* cited by examiner

Primary Examiner—Nathan M. Nutter

(57) ABSTRACT

The present invention provides a thermoplastic elastomer composition comprising a high-molecular-weight thermoplastic elastomer, a low-molecular-weight thermoplastic elastomer affinitive for the high-molecular-weight thermoplastic elastomer, and a rubber component. The ratio of the number-average molecular weight (Mn1) of the high-molecular-weight thermoplastic elastomer to the number-average molecular weight (Mn2) of the low-molecular-weight thermoplastic elastomer is not less than 1.2 nor more than 500. The rubber is dynamically cross-linked and dispersed in the thermoplastic elastomers. Further, the present invention provides a thermoplastic elastomer composition consisting of a mixture of a thermoplastic elastomer composition (F) containing a high-molecular-weight styrene thermoplastic elastomer having a number-average molecular weight not less than 80,000; a composition (G) consisting of a polar termination-modified thermoplastic elastomer and/or a polar-nonpolar graft polymer; and a rubber compound (H) containing EPDM as a main component thereof. The rubber component of the mixture is dynamically cross-linked and dispersed in the thermoplastic elastomers.

6 Claims, No Drawings

THERMOPLASTIC ELASTOMER COMPOSITION AND RUBBER ROLLER COMPOSED THEREOF

This application is a Divisional of nonprovisional application Ser. No. 09/862,701 filed May 23, 2001 and now U.S. Pat. No. 6,476,140.

BACKGROUND OF THE INVENTION

1. Field of the Invention

The present invention relates to a thermoplastic elastomer composition in which dynamically cross-linked rubber is dispersed. More particularly, the present invention relates to a thermoplastic elastomer composition which is preferably used to form a rubber roller having a high degree of flexibility and wear resistance so that the rubber roller can be used as a paper-feeding roller, for an ink jet printer or the like, required to be compatible with a recording liquid.

2. Description of the Related Art

The rubber roller is used in the paper-feeding mechanism of an ink jet printer, a laser printer, an electrostatic copying apparatus, a facsimile apparatus, an automatic deposit payment machine (ATM), and the like. The rubber roller is required to feed paper after picking up a sheet of paper or a film one by one from sheets of paper piled up. Therefore, it is necessary to provide the rubber roller with a high degree of flexibility and wear resistance.

Of the paper-feeding roller, the paper-feeding rubber roller for use in the ink jet printer is required to have favorable affinity (compatibility) for a recording liquid (aqueous ink). The recording liquid for the ink jet printer contains much polar components such as water and multivalent alcohol. If the rubber roller has unfavorable affinity for the recording liquid (polar), the recording liquid does not spread favorably on a portion of paper which contacted the rubber roller during feeding of the paper. As a result, a roller mark is formed on the paper.

The present applicant proposed the rubber roller composed of the thermoplastic elastomer composition formed by mixing the rubber component, the hydrogenated styrene thermoplastic elastomer, and the thermoplastic resin with one another; and dynamically cross-linking the rubber component with the resinous cross-linking agent and dispersing it in the mixture of the hydrogenated styrene thermoplastic elastomer and the thermoplastic resin.

In forming the thermoplastic elastomer composition, dynamic cross-linking speed is controlled by setting the addition amount of halogen serving as the resinous cross-linking agent to the range of 0.25–1.5 wt % or using both a halogen-added resinous cross-linking agent and a halogen-unadded resinous cross-linking agent. Cross-linking of the rubber component is completed when the mixing of the rubber and the resin has progressed in a certain extent. By doing so, the moldability and the dispersibility of the rubber can be secured, and the amount of the rubber component with respect to the resin can be increased.

As described above, by increasing the dispersibility of the rubber, it is possible to increase the flexibility of the rubber without deteriorating the durability of the molded rubber roller, enhance the paper-feeding performance of the rubber roller, and improve the wear resistance of the rubber roller. Further, by increasing the amount of the rubber component, the paper-feeding performance and durability of the rubber roller are enhanced further and reduction of worn powder is achieved.

In the thermoplastic elastomer composition disclosed by Japanese Patent No. 2837741, filed on Dec. 6, 1990, as Application No. 02-153784 to Tanaka Terutaka, titled "Thermoplastic Elastomer Composition", rubber is dynamically cross linked in not less than two kinds of thermoplastic elastomers. More specifically, the thermoplastic elastomer composition contains ethylene-α olefin copolymer rubber, a crystalline ethylene-propylene block copolymer resin, a low-molecular-weight propylene homo-polymerized resin having a number-average molecular weight of 2000–20000, and a softener consisting of mineral oil.

However, according to the thermoplastic elastomer composition proposed by the present applicant, the cross-linking speed is controlled slowly to increase the dispersibility of the rubber. Thus, the cross-linking density is low.

Accordingly, the mechanical property of the thermoplastic elastomer composition is low. In particular, the thermoplastic elastomer composition has a low degree of durability. Thus, a paper-feeding roller composed of the thermoplastic elastomer composition has low degree of paper-passing performance. Because there is a limit in the increase of the rubber component, it is impossible to greatly reduce generation of worn powder and improve the durability of the paper-feeding roller.

If the cross-linking density is increased by making the cross-linking speed high to solve the problem, the rubber component has a low degree of dispersibility. Consequently, the rubber component has a low degree of flexibility.

In the thermoplastic elastomer composition disclosed in U.S. Pat. No. 2,837,741, the low-molecular-weight propylene is used. Because polypropylene is not an elastomer, it deteriorates the mechanical property of the thermoplastic elastomer composition, especially flexibility.

The thermoplastic elastomer composition of this kind has a high flexibility in the case where the mixing amount of the rubber component is increased. Consequently, the paper-feeding roller composed of the thermoplastic elastomer composition has improved paper-feeding force and wear resistance, whereas the thermoplastic elastomer composition has deteriorated processability and moldability. To disperse cross-linked rubber particles uniformly in the thermoplastic elastomer, it is necessary to keep the mixing ratio of the rubber component constant. According to the conventional method, the maximum mixing ratio of the rubber component is 65–80 wt % with respect to the entire weight of a polymer (oil is excluded).

As the mixing ratio of a rubber-dispersing high-molecular-weight resin becomes more, the mechanical property of the thermoplastic elastomer composition is improved increasingly, the paper-feeding roller composed of the thermoplastic elastomer composition has paper-feeding performance increasingly, and generation of worn powder is suppressed increasingly. Therefore, in the conventional art, a styrene thermoplastic elastomer and thermoplastic resin having a high molecular weight are used.

However, the use of the high-molecular-weight styrene thermoplastic elastomer and thermoplastic resin causes the processability of the thermoplastic elastomer composition to deteriorate and the dispersibility of the rubber component of a mixture of resin and rubber oil to deteriorate in dynamically cross-linking the rubber. Thereby the paper-feeding roller composed of the thermoplastic elastomer composition deteriorates in its wear resistance and paper-feeding performance.

It is difficult for the conventional art to form the thermoplastic elastomer composition in which flexibility is compatible with wear resistance as well as durability. Thus there is a demand for the development of a thermoplastic elastomer having superior performance. It is ideal to develop a thermoplastic elastomer composition similar to rubber in it flexibility and similar to resin it its moldability and mechanical strength.

Any of the above-described thermoplastic elastomer compositions contains a non-polar material such as thermoplastic resin not in consideration of compatibility with a recording liquid such as aqueous ink (polar). Thus in the case where printing is made on super-fine glossy paper, photo-printing paper, color OHP paper or the like by using a rubber roller as the paper-feeding roller for an ink jet printer, the recording liquid does not spread on a portion of paper which has contacted the rubber roller during paper feeding. As a result, a roller mark is formed on the portion of the paper. That is, an irregular image is formed thereon.

Therefore, there is a growing demand for the development of the rubber roller, composed of the thermoplastic elastomer composition, having favorable affinity for an aqueous recording liquid (polar).

SUMMARY OF THE INVENTION

The present invention has been made in view of the problem. Thus, it is a first object of the present invention to provide a thermoplastic elastomer composition superior in flexibility and wear resistance as well as durability, and in addition moldability and superior as the material for a rubber roller.

It is a second object of the present invention to provide a rubber roller, serving as a paper-feeding roller for an ink jet printer or the like, affinitive for a recording liquid and in particular an aqueous ink and leaving no roller marks on a printed portion of paper when printing is performed on the paper with the recording liquid.

To achieve the object, the present invention provides a thermoplastic elastomer composition comprising a high-molecular-weight thermoplastic elastomer, a low-molecular-weight thermoplastic elastomer affinitive for the high-molecular-weight thermoplastic elastomer, and a rubber component. The ratio of the number-average molecular weight (Mn1) of the high-molecular-weight thermoplastic elastomer to the number-average molecular weight (Mn2) of the low-molecular-weight thermoplastic elastomer is not less than 1.2 nor more than 500. The rubber is dynamically cross-linked and dispersed in the thermoplastic elastomers.

"Thermoplastic elastomers affinitive for each other" means that both thermoplastic elastomers have a similar structure or an identical structure.

The high-molecular-weight thermoplastic elastomer is conventionally used to form a rubber roller or the like. On the other hand, according to the first invention of the present invention, a mixture of the high-molecular-weight thermoplastic elastomer and the low-molecular-weight thermoplastic elastomer affinitive therefor is used. Thereby, unlike in the conventional thermoplastic elastomer composition consisting of the high-molecular-weight thermoplastic elastomer as the thermoplastic elastomer, it is possible to prevent the rubber component from being dispersed unfavorably in the thermoplastic elastomer. That is, it is possible to prompt the cross-linking speed of the rubber and disperse the rubber component favorably in the thermoplastic elastomer. Thus the present invention has improvement over the conventional art in processability. Thereby the present invention allows the thermoplastic elastomer composition to contain a much larger amount of the rubber component and thus have a higher degree of flexibility than the conventional thermoplastic elastomer composition. Thus, the paper-feeding roller made of the thermoplastic elastomer composition achieves improved paper-feeding performance.

According to the first invention, the high-molecular-weight thermoplastic elastomer and the low-molecular-weight thermoplastic elastomer are mixed with each other in such a way that the ratio of the number-average molecular weight (Mn1) of the former to that of the latter is not less than 1.2 nor more than 500. Thereby the first invention maintains the advantage (high mechanical property, improved durable performance (paper-feeding performance) when paper is passed through paper-feeding roller, and suppression of generation of worn powder) of the high-molecular-weight thermoplastic elastomer, minimizes the reduction of moldability and processability of the thermoplastic elastomer composition, and increases the mixing ratio of the rubber component.

The reason the ratio of Mn1/Mn2 is set to not less than 1.2 nor more than 500 is as follows: If the ratio of Mn1/Mn2 is less than 1.2, it is impossible to improve the moldability and processability of the thermoplastic elastomer composition sufficiently while maintaining the favorable mechanical property of the high-molecular-weight thermoplastic elastomer. More favorably, the lower limit of the ratio of Mn1/Mn2 is set to not less than 1.5 and most favorably not less than 5.0.

The upper limit of the ratio of Mn1/Mn2 is different according to the kind of the thermoplastic elastomer to be used. It is necessary to keep the property of the high-molecular-weight thermoplastic elastomer and the low-molecular-weight thermoplastic elastomer appropriate. It is necessary that the number-average molecular weight Mn2 is not less than 10,000 to prevent deterioration of the property of the low-molecular-weight thermoplastic. Presumably, the existing polymer has a molecular weight less than five millions. Therefore, as described above, the upper limit of the ratio of Mn1/Mn2 is favorably not more than 500 and more favorably not more than 50.

It is possible to add a thermoplastic elastomer having a number-average molecular weight intermediate between that of-the high-molecular-weight thermoplastic elastomer and that of the low-molecular-weight thermoplastic elastomer to the mixture of the affinitive high-molecular-weight thermoplastic elastomer and the affinitive low-molecular-weight thermoplastic elastomer satisfying the ratio of Mn1/Mn2. The thermoplastic elastomers of the mixture can be selected from among resins commercially available. It is possible to synthesize resins having different polymerization degrees and the ratio of Mn1/Mn2 in the above-described range by controlling molecular-weight distribution in a polymerization time. In this case, the thermoplastic elastomer composition may contain a thermoplastic elastomer having a number-average molecular weight intermediate between that of the high-molecular-weight thermoplastic elastomer and that of the low-molecular-weight thermoplastic elastomer.

The present invention provides a thermoplastic elastomer composition containing a thermoplastic elastomer (A) mixed with one or a plurality of compositions selected from among the following (B), (C), and (D) in such a way that a rubber component in a mixture is dynamically cross-linked and dispersed uniformly therein.

(A) A thermoplastic elastomer consisting of a high-molecular-weight styrene thermoplastic elastomer having a number-average molecular weight of not less than 80,000 and a low-molecular-weight styrene thermoplastic elastomer having a number-average molecular weight of not more than 70,000, (B) A softener which is added to the thermoplastic elastomer (A) at not more than 500 wt % with respect to 100 wt % of the rubber (softener is excluded) contained in the composition (D), (C) A resinous mixture consisting of a resinous mixture which contains thermoplastic resin as its main component and is added to the thermoplastic elastomer (A) at not more than 50 wt % with respect to 100 wt % of the rubber (softener is excluded) contained in the composition (D), and (D) A composition consisting of a rubber compound which contains a softener and diene rubber such as EPDM as its main component and is added to the thermoplastic elastomer (A) at not more than 600 wt % with respect to 100 wt % of the rubber.

It is proper to set the weight ratio of [(A)+(C)] to [the rubber component contained in (D)] to 85:15–15:85. If the weight ratio of the rubber component is less than 15, the rubber is incapable of maintaining its flexibility and elasticity. If the weight ratio of the rubber component is more than 85, the thermoplastic elastomer composition has a low degree of moldability, and it is difficult to obtain dynamically cross-linked substance.

The weight ratio between [(A)+(C)] and [rubber component contained in (D)] is more favorably 70:30–20:80, although the weight ratio is different according to the kind of the thermoplastic elastomer; the ratio between the thermoplastic elastomer and the rubber component; the kind of other mixing components (softener, preserving agent, and the like), and the kind of a cross-linking agent.

The mixing weight ratio between the high-molecular-weight thermoplastic elastomer to the low-molecular-weight thermoplastic elastomer is favorably 95:5–1:99, more favorably 90:10–5:95, and most favorably 75:25–15:85. An optimum mixing weight ratio therebetween can be selected according to the purpose of use of the thermoplastic elastomer composition and the kind and mixing ratio of other components.

As described above, it is preferable to use a combination of the high-molecular-weight thermoplastic elastomer and the low-molecular-weight thermoplastic elastomer. It is also preferable to use a combination of the styrene thermoplastic elastomer and the EPDM to form the rubber. In addition, it is also preferable to use a combination of a polyester thermoplastic elastomer and diene rubber or a combination of a chlorinated thermoplastic elastomer such as chlorinated polyethylene and polar diene rubber such as NBR to form the rubber.

It is particularly preferable to use a combination of a hydrogenated styrene thermoplastic elastomer and the EPDM.

The double bond of the hydrogenated styrene thermoplastic elastomer is saturated with hydrogenation and has a low hardness and a high friction coefficient. Thus the hydrogenated styrene thermoplastic elastomer does not have a reaction with a cross-linking agent and thus is not cross-linked therewith in the dynamic cross-linking of the rubber. That is, the hydrogenated styrene thermoplastic elastomer displays its required plasticity without inhibiting the cross-linking of the rubber after the dynamic cross-linking of the rubber is completed. Accordingly, in the second invention, it is preferable to use the styrene thermoplastic elastomer which is hydrogenated in such an extent that it is not cross-linked in the dynamic cross-linking of the rubber. As the hydrogenated styrene thermoplastic elastomer, it is possible to use styrene-ethylene-styrene copolymer (SES), styrene-ethylene/propylene-styrene copolymer (SEPS), styrene-ethylene-ethylene/propylene-styrene copolymer (SEEPS), and styrene-ethylene/butylene-styrene copolymer (SEBS).

Supposing that both the high-molecular-weight thermoplastic elastomer and the low-molecular-weight thermoplastic elastomer are the styrene thermoplastic elastomer, the ratio of the number-average molecular weight $Mn1$ of the high-molecular-weight thermoplastic elastomer to the number-average molecular weight $Mn2$ of the low-molecular-weight thermoplastic elastomer ($Mn1/Mn2$) is set to not less than 1.2 nor more than 500. In this condition, the number-average molecular weight $Mn1$ is favorably not less than 80,000 as described above, more favorably not less than 150,000 and most favorably not less than 250,000; and the number-average molecular weight $Mn2$ is favorably not more than 70,000 and more favorably not more than 60,000. Those skilled in the art can select a preferable combination of the high-molecular-weight thermoplastic elastomer and the low-molecular-weight thermoplastic elastomer. For example, it is particularly favorable to use a combination of SEEPS having a number-average molecular weight of not less than 80,000 and SEPS or SEEPS having a number-average molecular weight of not more than 70,000. In addition, it is possible to use combinations appropriately selected from among SES, SEPS, SEEPS, and SEBS.

As the thermoplastic resin to be contained as the main component of the resinous mixture (C), it is possible to use the following olefin resins commercially available: polyethylene, polypropylene, ethylene ethyl acrylate resin, ethylene vinyl acetate resin, ethylene methacrylate resin, and ionomer resin. The resinous mixture (C) may contain polyester resin, chlorinated polyethylene or the like.

The elastomer composition contains thermoplastic resin at favorably not more than 50 wt %, more favorably at 2–40 wt %, and most favorably 4–35 wt % with respect to 100 wt % of the rubber (softener is excluded) contained in the composition (D)

As the rubber component to be contained in the rubber compound (D), the following diene rubbers can be preferably used: ethylene-propylene-diene rubber (EPDM), natural rubber (NR), butadiene rubber (BR), styrene butadiene rubber (SBR), isoprene rubber, acrylonitrile-butadiene rubber, and the like. By combining the diene rubber in combination with the thermoplastic resin, it is possible to use a cross-linking agent which cross-links the diene rubber but does not cross-link the thermoplastic resin.

According to the second invention, particularly favorable rubber to be contained in the rubber compound is EPDM. It is most favorable that the rubber compound consists of the EPDM. The main chain of the EPDM consists of saturated hydrocarbon and does not have double bond. Therefore, even though the EPDM is exposed to a high-density ozone atmosphere or irradiated with light for a long time, the molecular main chain is hardly cut. Accordingly, an end product, for example, a rubber roller has enhanced weatherability. As the EPDM, it is possible to use non-oil-extended type consisting of a rubber component and oil-extended type containing the rubber component and extended oil. According to the second invention, it is possible to use the EPDM of both types singly or a mixture of the EPDM of both types.

The EPDM may be mixed with one or a plurality of butyl rubber, BR, isoprene rubber, SBR, chloroprene rubber (CR), NR, acrylonitrile-butadiene rubber, acrylic rubber, ethylene-propylene rubber (EPR).

In mixing the EPDM and one or a plurality of rubbers with each other, the weight percentage of the EPDM to all the rubbers is favorably not less than 50 and more favorably not less than 80.

As the softener (B), oil and plasticizer can be used. As the oil, it is possible to use known synthetic oil such as paraffin oil, naphthenic oil, mineral oil of aromatic series, oligomer of hydrocarbon series, and process oil. As the synthetic oil, it is possible to use oligomer of α-olefin, oligomer of butane, and amorphous oligomer of ethylene and α-olefin. As the plasticizer, it is possible to use dioctyl phthalate (DOP), dibutyl phthalate (DBP), dioctyl sebacate (DOS), dioctyl adipate (DOA), and the like.

In the case where oil is used as the softener (B), the oil is added to the thermoplastic elastomer (A) at not more than 600 wt % and favorably 25–400 wt % with respect to 100 wt % of the rubber component. In the case where a plasticizer is used as the softener (B), the plasticizer is added to the thermoplastic elastomer (A) at not more than 400 wt % and favorably 15–350 wt % with respect to 100 wt % of the rubber component.

In the case where the oil is added to the thermoplastic elastomer (A) at more than 600 wt % with respect to 100 wt % of the rubber component, the oil may breed from the surface of a dynamically cross-linked substance or the oil may inhibit the cross-linking of the rubber. Thus, the rubber component is not cross-linked sufficiently. Consequently, the resulting thermoplastic elastomer composition has deteriorated property.

The third invention provides a thermoplastic elastomer composition consisting of a mixture of a thermoplastic elastomer composition (F) containing a high-molecular-weight styrene thermoplastic elastomer having a number-average molecular weight not less than 80,000; a composition (G) consisting of a polar termination-modified thermoplastic elastomer and/or a polar-nonpolar graft polymer; and a rubber compound (H) containing EPDM as a main component thereof.

The rubber component of the mixture is dynamically cross-linked and dispersed in the thermoplastic elastomers.

According to the third invention, the thermoplastic elastomer composition contains the composition (G) consisting of the polar termination-modified thermoplastic elastomer and/or the polar-nonpolar graft polymer. Thus, in the case where a rubber roller composed of the thermoplastic elastomer composition is used as a paper-feeding roller for an ink jet printer, the paper-feeding roller has favorable affinity for a recording liquid, in particular, for aqueous ink. Thus a favorable image can be formed on a sheet of paper without a roller mark being formed thereon. Because the thermoplastic elastomer composition contains the polar part and the non-polar part, the aqueous ink (polar) has favorable affinity for the components (non-polar) of the thermoplastic elastomer composition such as the thermoplastic resin, the EPDM, and the like. It is preferable to modify the termination of the thermoplastic elastomer into hydroxyl group as the polar termination-modified. The termination of the thermoplastic elastomer may be modified into other polar groups, if the thermoplastic elastomer having its termination modified into other polar groups is soluble with the components, namely, the thermoplastic resin, the styrene thermoplastic elastomer, and the EPDM composing the skeleton of the thermoplastic elastomer composition.

The thermoplastic elastomer composition (F) contains a termination-unmodified low-molecular-weight styrene thermoplastic elastomer having a number-average molecular weight not more than 70,000; and not more than 600 wt % of oil with respect to 100 wt % of rubber contained in the rubber compound (H). A mixture of the thermoplastic elastomer composition (F), the composition (G), and the rubber compound (H) may contain a resinous composition (I), containing the thermoplastic resin as its main component, not more than 50 wt % with respect to 100 wt % of the rubber contained in the rubber compound (H); a softener (J) not more than 500 wt % with respect to 100 wt % of the rubber contained in the rubber compound (H); and a resinous cross-linking agent (K).

The thermoplastic elastomer composition contains the termination-modified or termination-unmodified low-molecular-weight styrene thermoplastic elastomer having a number-average molecular weight not more than 70,000 or favorably not more than 60,000. The rubber is dynamically cross-linked and dispersed in the thermoplastic elastomers. The rubber is dynamically cross-linked and dispersed in the thermoplastic elastomers. Thereby, unlike in the conventional thermoplastic elastomer composition consisting of the high-molecular-weight thermoplastic elastomer as the thermoplastic elastomer, it is possible to prevent the rubber component from being dispersed unfavorably in the thermoplastic elastomer. That is, it is possible to prompt the cross-linking speed of the rubber and disperse the rubber component favorably in the thermoplastic elastomer. Thus the present invention has improvement over the conventional art in processability.

The number-average molecular weight of the high-molecular-weight styrene thermoplastic elastomer of the thermoplastic elastomer composition (F) is set to not less than 80,000 is to allow the thermoplastic elastomer composition to have preferable mechanical property (wear resistance and durability). The number-average molecular weight of the high-molecular-weight styrene thermoplastic elastomer is favorably not less than 150,000 and more favorably not less than 250,000.

The number-average molecular weight of the termination-unmodified low-molecular-weight thermoplastic elastomer of the thermoplastic elastomer composition (F) is set to not more than 70,000 and favorably not less than 10,000 nor more than 60,000 is to improve moldability and processability of the thermoplastic elastomer composition (F) and improve the dispersibility of the rubber. In the case where both the high-molecular-weight thermoplastic elastomer and the low-molecular-weight thermoplastic elastomer are used, those skilled in the art can select a preferable combination. For example, it is preferable to select a combination of styrene-ethylene-ethylene/propylene-styrene copolymer (SEEPS) having a molecular weight of not less than 80,000 and styrene-ethylene/propylene-styrene copolymer (SEPS) or SEEPS having a molecular weight of not more 70,000. In addition, it is possible to appropriately select a combination from among styrene-ethylene-styrene copolymer (SES), SEPS, SEEPS, and styrene-ethylene/butylene-styrene copolymer (SEBS).

For the above-described reason, the hydrogenated styrene thermoplastic elastomer similar to that of the second invention can be preferably used as the high-molecular-weight styrene thermoplastic elastomer of the thermoplastic elastomer composition (F), the termination-unmodified low-molecular-weight thermoplastic elastomer, and the polar termination-modified thermoplastic elastomer of the composition (G).

As the polar termination-modified thermoplastic elastomer of the composition (G), it is possible to use low-molecular-weight SEEPS whose termination is modified into hydroxyl group.

Polyethylene glycol graft polyethylene can be used as the polar-nonpolar graft polymer of the composition (G).

Because the thermoplastic elastomer composition contains the polar termination-modified thermoplastic 1–5 elastomer of the composition (G), the thermoplastic elastomer composition has favorable affinity for the polar recording liquid under the influence of the low-molecular-weight SEEPS whose termination is modified into hydroxyl group. Further because the thermoplastic elastomer composition contains the polar-nonpolar graft polymer of the composition (G), a polar part is introduced thereinto, the thermoplastic elastomer composition has improved affinity for the ink jet recording liquid (polar).

As the softener (J), oil and plasticizer similar to those of the second invention can be used. These softeners can be used in the range in which the compatibility thereof with non-polar rubber does not deteriorate and a roller mark is not formed on paper by the paper-feeding roller composed of the thermoplastic elastomer composition.

In the case where oil is used as the softener (J), the oil is added to the mixture of the thermoplastic elastomer (F), the composition (G), and the rubber compound (H) at not more than 500 wt % and favorably 25–400 wt % with respect to 100 wt % of the rubber component.

In the case where the oil is added to the mixture at more than 500 wt % with respect to 100 wt % of the rubber component, the oil may breed from the surface of a dynamically cross-linked substance or the oil may inhibit the cross-linking of the rubber. Thus, the rubber component is not cross-linked sufficiently. Consequently, the resulting thermoplastic elastomer composition has deteriorated property.

In the case where plasticizer is used as the softener (J), 15–400 wt % of the plasticizer is added to the mixture with respect to 100 wt % of the rubber component. It is favorable to add 25–200 wt % of the plasticizer thereto.

It is possible to improve the wear resistance of the thermoplastic elastomer composition by mixing the resinous composition (I) containing the thermoplastic resin as its main component with the mixture of the thermoplastic elastomer (F), the composition (G), and the rubber compound (H). As the thermoplastic resin contained in the resinous composition (I) as its main component, olefin resins commercially available can be used: polyethylene, polypropylene, ethylene ethyl acrylate resin, ethylene vinyl acetate resin, ethylene methacrylate resin, ionomer resin, or the like. The resinous composition (I) may contain polyester resin, chlorinated polyethylene or the like.

It is possible to improve the wear resistance of the thermoplastic elastomer composition by adding the resinous composition (I) containing the thermoplastic resin as its main component to the mixture of the thermoplastic elastomer (F), the composition (G), and the rubber compound (H) at not more than 50 wt % thereof with respect to 100 wt % of the rubber component (softener is excluded) It is more favorable to add the resinous composition (I) at not less than 2 wt % of the resinous composition (I) nor more than 40 wt % and more favorable at not less than 4 wt % nor more than 35 wt % with respect to 100 wt % of the rubber component.

The rubber compound (H) may contain diene rubber instead of the EPDM (ethylene-propylene-diene rubber). As the diene rubber, it is possible to use natural rubber (NR), butadiene rubber (BR), styrene butadiene rubber (SBR), isoprene rubber (IR), and acrylonitrile-butadiene rubber (NBR). In the case where the diene rubber is used in combination with thermoplastic resin, it is possible to use a cross-linking agent which cross-links the diene rubber but does not cross-link the thermoplastic resin.

In the third invention, it is particularly favorable that the rubber compound consists of the EPDM. Thereby for the above-described reason, it is possible to enhance the weatherability of the rubber roller composed of the thermoplastic elastomer composition, similarly to the second invention. It is preferable to use the EPDM of the oil-extended type in the third invention.

Similarly to the second invention, the EPDM may be mixed with one or a plurality of rubbers selected from among butyl rubber and the like.

In mixing the EPDM and one or a plurality of rubbers with each other, the weight ratio of the EPDM to entire the rubber component is favorably not less than 50 and more favorably not less than 80.

The weight ratio between [the styrene thermoplastic elastomer of the thermoplastic elastomer (F)] and [the composition (G)] is set to 95:5–1:99. If the weight ratio is out of 95:5, it is impossible to prevent the rubber roller from forming a roller mark on paper. If the weight ratio is out of 1:99, there is a possibility that the rubber roller has deteriorated mechanical property, and worn powder is generated.

The weight ratio between the styrene thermoplastic elastomer and the thermoplastic elastomer composition (F) is favorably 90:10–5:95 and more favorably 80:20–15:85. An optimum weight ratio therebetween can be selected appropriately according to the purpose of use and the relationship between the styrene thermoplastic elastomer and other components of the thermoplastic elastomer composition.

The weight ratio of the polar-nonpolar graft polymer of the composition (G) to the entire polymer contained in the mixture (softener, cross-linking agent, filler, processing aid, zinc white, and the like are excluded) is not less than 3 nor more than 15. If the weight percentage is less than three, the thermoplastic elastomer composition has an insufficient polarity and thus it is impossible to suppress the generation of the roller mark. On the other hand, if the weight percentage is more than 15, the entire thermoplastic elastomer composition is frail and thus unsuitable as the rubber roller. The "polymer" herein means EPDM, SEEPS, SEPS, polar-nonpolar graft polymer, PP, and the like.

A resinous cross-linking agent can be used preferably as the cross-linking agent which is used to dynamically cross-link the rubber in the present invention (first through third invention). The resinous cross-linking agent is used to allow the rubber to make a cross-linking reaction by heating or the like. The resinous cross-linking agent is preferable because blooming does not occur when it is used in combination with sulfur and a vulcanizing accelerator. It is possible to enhance the paper-feeding performance of the rubber roller when phenol resin is used as the resinous cross-linking agent.

As other resinous cross-linking agents, melamine-formaldehyde resin, triazine, formaldehyde condensate, hexametoxymethyl-melamine resin, and the like can be used. Phenol resin is most favorable. As the phenol resin, it is possible to use phenol resins synthesized by reaction of phenols such as phenol, alkylphenol, cresol, xylenol, and resorcin with aldehydes such as formaldehyde, acetic aldehyde, and furfural. It is preferable to use alkylphenol-formaldehyde resin resulting from reaction of formaldehyde and alkylphenol having alkyl group connected to the ortho position or the para position of benzene, because it is compatible with rubber and reactive and makes a cross-linking reaction start time comparatively early. Alkyl group of the alkylphenol-formaldehyde resin has 1–10 carbon atoms. As the alkyl group, methyl group, ethyl group, propyl group, butyl group, and the like are listed. It is possible to use modified alkylphenol resin formed by addition condensation of sulfide-p-tert-butylphenol and aldehydes and alkylphenol sulfide resin as the resinous cross-linking agent. The resinous cross-linking agent is used at favorably not less than 1 wt % nor more than 50 wt % and more favorably not less than 8 wt % nor more than 15 wt % with respect to 100 wt % of rubber.

The dynamic cross-linking in the present invention (first through third invention) may be accomplished under the presence of chloride, bromide, fluoride or iodine. To allow halogen to be present in the dynamic cross-linking time, a halogenated resinous cross-linking agent is used or a halogen donor is added to the elastomer composition. As the halogenated resinous cross-linking agent, halogenated resin of addition condensation type can be used. Above all, halogenated phenol resin having at least one halogen atom connected to the aldehyde unit of the phenol resin is favorable. Halogenated alkylphenol formaldehyde resin is most favorable because it is compatible with rubber and reactive and makes a cross-linking reaction start time comparatively early.

As the halogen donor, tin chloride such as stannic chloride, ferric oxide, cupric chloride, and the like can be used. Chlorinated polyethylene also can be used as the halogen donor. The halogen donors can be used singly or in combination of two or more thereof.

A cross-linking activator may be used to accomplish a proper cross-liking reaction. Metal oxide is used as the cross-linking activator. As the metal oxide, zinc oxide and zinc carbonate are preferable.

A filler may be added to the thermoplastic elastomer composition of the present invention (first through invention) as necessary to improve its mechanical strength. As the filler, it is possible to use silica, carbon black, clay, talc, calcium carbonate, titanium oxide, and the like. It is preferable to add the filler to the thermoplastic elastomer composition at not more than 30 wt % with respect to 100 wt % of rubber (softener is excluded). If the filler is used at more than 30 wt %, the flexibility of rubber may deteriorate.

It is possible to add an age resistor, wax, and the like to the thermoplastic elastomer composition. As the age resistor, it is possible to use imidazoles such as 2-mercaptobenzimidazole; amines such as phenyl-α-naphthylamine, N,N'-di-6-naphthyl-p-phenylenediamine, and N-phenyl-N'-isopropyl-p-phenylenediamine; and phenols such as di-t-butyl-p-cresol, styrenated phenol, and the like.

The thermoplastic elastomer composition of the present invention (first through third invention) is durable, elastic, flexible, and moldable. In addition, because the thermoplastic elastomer composition has favorable affinity for the polar recording liquid, it can be used widely. Above all, the thermoplastic elastomer composition can be molded into the paper-feeding rubber roller of an ink jet printer, a laser printer, an electrostatic copying machine, facsimile apparatus, an ATM, and the like all of which are required to feed paper by picking up thin paper or a film. Because the thermoplastic elastomer composition of the third invention has favorable affinity for the recording liquid and in particular the polar recording liquid, the thermoplastic elastomer composition can be preferably used to form the paper-feeding rubber roller of the ink jet printer supplying a high-quality image.

The rubber roller can be manufactured by cylindrically shaping a polymer composition containing the thermoplastic elastomer composition of the present invention.

The rubber roller can be prepared by the following method. After the thermoplastic elastomer composition is swollen in the softener, the thermoplastic elastomer composition is mixed with a pellet of thermoplastic resin. The mixture is kneaded. Then, the mixture is extruded and formed into a pellet. The pellet, the rubber, the resinous cross-linking agent, and mixing agents are supplied into a rubber-kneading device such as a biaxial extruder, an open roll, a Banbury mixer or a kneader. Then, the mixture is kneaded for 1–20 minutes while it is heated at 160° C.–220° C. to dynamically vulcanize the rubber. Then, the rubber composition is extruded in the shape of a pellet from the rubber-kneading device. The pelletlike rubber composition is poured into an injection molding device (injection molder) to tubularly mold the rubber composition. After the surface of the molded material is polished as necessary, the molded article is cut to a required size. In this manner, the rubber roller is produced.

The rubber composition may be tubularly extruded by a single-axis extruder instead of the injection molding device, and cut to a predetermined size to obtain the rubber roller. Because the rubber composition of the present invention is superior in moldability and flowability, it is possible to greatly improve productivity by extruding the rubber composition at a high speed and cutting it to a predetermined size.

The hardness of the rubber roller is 15–45 and favorably 20–40 when its hardness is measured by an A-type hardness tester of JIS6301. The rubber roller having the hardness in this range deforms sufficiently when it is pressed against paper or a film at a comparatively small pressure force. Consequently the rubber roller contacts the paper or the film in a large area.

The rubber roller tubularly formed has a thickness of 0.5 mm–8 mm and preferably 1 mm–5 mm. If the rubber roller has a too small thickness, it is difficult to form a large area of contact between the rubber roller and paper when the rubber roller deforms, although the strength of the rubber roller should be considered. On the other hand, if the rubber roller has a too large thickness, it is necessary to press the rubber roller against the paper at a great force to deform the rubber roller. In this case, it is necessary to enlarge a mechanism for pressing the rubber roller against the paper.

DETAILED DESCRIPTION OF THE PREFERRED EMBODIMENTS

A first embodiment of the present invention will be described below.

A cylindrical paper-feeding rubber roller is prepared by shaping a thermoplastic elastomer composed of the following components. A shaft is inserted into a hollow portion of the rubber roller by press fit or the shaft is bonded to the rubber roller.

The thermoplastic elastomer composition of the first embodiment is a rubber composition containing:

(A) An thermoplastic elastomer consisting of a high-molecular-weight hydrogenated styrene thermoplastic elastomer and a low-molecular-weight hydrogenated styrene thermoplastic elastomer (the ratio of the number-average molecular weight Mn1 of the high-molecular-weight hydrogenated styrene thermoplastic elastomer to the number-average molecular weight Mn2 of the low-molecular-weight hydrogenated styrene thermoplastic elastomer is: $500 \geq Mn1/Mn2 \geq 1.2$)

(B) Softener (C) Thermoplastic resin (D) Diene rubber such as EPDM (E) Resinous cross-linking agent and cross-linking accelerator The rubber is dynamically cross-linked with the resinous cross-linking agent and is dispersed in a mixture of the thermoplastic resin and the two hydrogenated styrene thermoplastic elastomers having different molecular weights.

The thermoplastic elastomer (A) contains SEEPS as the high-molecular-weight hydrogenated styrene thermoplastic elastomer and SEPS or SEEPS as the low-molecular-weight hydrogenated styrene thermoplastic elastomer. Polypropylene is used as the thermoplastic resin (C). Zinc oxide is used as the cross-linking accelerator. Phenol resinous cross-linking agent is used as the resinous cross-linking agent.

Paraffin oil is used as the softener added to the thermoplastic elastomer (A) to improve processability and hardness adjustment.

As shown in tables 1 and 2, a injection molding material having the formulation described in tables 1 and 2 was prepared for each of examples 1–8 and comparison examples 1–8. The material was injection-molded to shape it cylindrically. The cylindrical injection-molded material was cut to a predetermined size, and a shaft was fitted into the material to prepare a rubber roller for each of examples 1–8 and comparison examples 1–8.

TABLE 1

|  | E1 | E2 | E3 | E4 | E5 | E6 | E7 | E8 |
|---|---|---|---|---|---|---|---|---|
| Rubber | 55 | 80 | 85 | 55 | 55 | 55 | 55 | 55 |
| High-molecular-weight hydrogenated styrene TPE1 | 8.75 | 3.75 | 2.75 | 1.75 | 31.50 | 8.75 | 8.75 | 0 |
| High-molecular-weight hydrogenated styrene TPE2 | 0 | 0 | 0 | 0 | 0 | 0 | 0 | 8.75 |
| Low-molecular-weight hydrogenated styrene TPE1 | 0 | 0 | 0 | 0 | 0 | 26.3 | 0 | 0 |
| Low-molecular-weight hydrogenated styrene TPE2 | 26.25 | 11.25 | 8.25 | 33.25 | 3.50 | 0 | 26.25 | 26.25 |
| Thermoplastic resin | 10 | 5 | 4 | 10 | 10 | 10 | 10 | 10 |
| Softener | 110 | 110 | 200 | 110 | 110 | 110 | 110 | 110 |
| Resinous cross-linking agent 1 | 6.6 | 9.6 | 10.2 | 6.6 | 6.6 | 6.6 | 1.65 | 6.6 |
| Resinous cross-linking agent 2 | 0 | 0 | 0 | 0 | 0 | 0 | 4.95 | 0 |
| Cross-linking activator | 2.75 | 4 | 4.25 | 2.75 | 2.75 | 2.75 | 2.75 | 2.75 |
| Moldability | ⊚ | Δ | Δ | ⊚ | ○ | ⊚ | ⊚ | ○ |
| Initial performance {postcard-feeding performance (start time of paper-passing test)} | ○ | ○ | ○ | ○ | ○ | ○ | ○ | ○ |
| Durable performance {postcard-feeding performance (after 5000 sheets passed through roller)} | ○ | ○ | Δ | Δ | Δ | ○ | ○ | Δ |
| Durability (generation of worn powder | ⊚ | ⊚ | Δ | Δ | ○ | ○ | ○ | ○ |

Where "E" denotes example.

TABLE 2

|  | CE1 | CE2 | CE3 | CE4 | CE5 | CE6 | CE7 | CE8 |
|---|---|---|---|---|---|---|---|---|
| Rubber | 55 | 65 | 65 | 90 | 90 | 90 | 55 | 55 |
| High-molecular-weight hydrogenated styrene TPE1 | 35 | 27 | 27 | 1.75 | 1.75 | 0 | 0 | 0 |
| High-molecular-weight hydrogenated styrene TPE2 | 0 | 0 | 0 | 0 | 0 | 0 | 0 | 35 |
| Low-molecular-weight hydrogenated styrene TPE1 | 0 | 0 | 0 | 0 | 0 | 0 | 0 | 0 |
| Low-molecular-weight hydrogenated styrene TPE2 | 0 | 0 | 0 | 5.25 | 5.25 | 7 | 35 | 0 |
| Thermoplastic resin | 10 | 8 | 8 | 3 | 3 | 3 | 10 | 10 |
| Softener | 110 | 110 | 110 | 110 | 200 | 200 | 110 | 110 |
| Resinous cross-linking agent 1 | 6.6 | 7.8 | 1.95 | 10.8 | 10.8 | 10.8 | 6.6 | 6.6 |
| Resinous cross-linking agent 2 | 0 | 0 | 5.85 | 0 | 0 | 0 | 0 | 0 |
| Cross-linking activator | 2.75 | 3.25 | 3.25 | 4.5 | 4.5 | 4.5 | 2.75 | 2.75 |
| Moldability | ○ | X | Δ | XX | X | X | ⊚ | ○ |
| Initial performance {postcard-feeding performance (start time of paper-passing test)} | Δ | Δ | ○ | — | ○ | ○ | ○ | Δ |
| Durable performance {postcard-feeding performance (after paper-passing test terminates)} | X | Δ | Δ | — | Δ | Δ | X | X |
| Durability (generation of worn powder | ○ | ○ | X | — | Δ | X | X | X |

Where "CE" denotes comparison example.

The numerical values shown in tables 1 and 2 indicate weight percentage. The abbreviation of TPE indicates thermoplastic elastomer.

Materials used are as follows:
EPDM (rubber): produced by Sumitomo Chemical Corp., Esprene 670F (paraffin oil 100%, oil-extended)
high-molecular-weight hydrogenated styrene TPE1: SEEPS (Mn=301,000, Mw=342,000), produced by Kuraray Corp., Septon 4077)
High-molecular-weight hydrogenated styrene TPE2: SEEPS (Mn=88,000, Mw=94,000), produced by Kuraray Corp., Septon 4033)
Low-molecular-weight hydrogenated styrene TPE1: SEPS (Mn=51,000, Mw=55,000), produced by Kuraray Corp., Septon 2002)
Low-molecular-weight hydrogenated styrene TPE2: SEEPS (one termination is modified into hydroxyl group) (Mn=54,000, Mw=60,000), produced by Kuraray Corp., Septon HG252)
Thermoplastic resin: polypropylene, produced by Japan Polychem Corp., Novatec PP BC6
Softener: paraffin oil, produced by Idemitsu Kosan Corp., Diana process oil PW-380
Cross-linking activator: Chinese white No.1, produced by Mitsui Metal Industrial Corp.
Resinous cross-linking agent 1: produced by Taoka Chemical Corp., Tackirol 250-III
Resinous cross-linking agent 2: produced by Taoka Chemical Corp., Tackirol 201

The rubber rollers were prepared as follows:

After the thermoplastic elastomer composition was swollen in the softener, a mixture of the thermoplastic elastomer composition and a pellet of thermoplastic resin was kneaded by a rubber-kneading device such as a biaxial extruder, a Banbury mixer or a kneader for 1–20 minutes at 160° C.–200° C. to prepare a pellet consisting of a mixture (compound) of the thermoplastic elastomer composition, the thermoplastic resin, and the softener. Then, the pellet, the rubber, and additives of reactive phenol resin, zinc white, age resistor, a filler, and the like were supplied to a biaxial extruder HTM38 (produced by IVEC Corp.). The mixture was kneaded for 1–20 minutes at 160° C.–200° C. to dynamically vulcanize the rubber. Then, the rubber composition is extruded in the shape of a pellet from the biaxial extruder. The pelletlike rubber composition was injection-molded by an injection molding device to tubularly mold the rubber composition. Thereafter the molded material was cut to a required size. That is, the rubber roller thus prepared had an outer diameter of 30 mm, an inner diameter of 25 mm, and a width of 15 mm.

EXAMPLES 1–8

The thermoplastic elastomer composition of each of the examples 1–8 contained the mixture (A) of the two hydrogenated styrene thermoplastic elastomers having different molecular weights (500≧Mn1/Mn2≧1.2), the thermoplastic resin (C), and the rubber (D).

The thermoplastic elastomer composition of each of the comparison examples 1–8 contained the thermoplastic elastomer composition different from those of examples 1–8. More specifically, the thermoplastic elastomer composition of each of the comparison examples 1, 2, 3, and 8 contained only the high-molecular-weight hydrogenated styrene thermoplastic elastomer as the thermoplastic elastomer-composition. The thermoplastic elastomer composition of each of the comparison examples 6 and 7 contained only the low-molecular-weight hydrogenated styrene thermoplastic elastomer as the thermoplastic elastomer composition. The rubber roller of each of the comparison examples 4 and 5 contained much rubber. That is, the weight ratio between the resinous components and the rubber component, namely, [(A)+(C)]:[rubber component contained in (D)] is 10:90.

The rubber rollers of the examples 1–8 and the comparison examples 1–8 were examined on moldability, paper-feeding performance, and generation of worn powder. Evaluated results are shown in the tables 1 and 2.

Moldability Test

The surface of each injection-molded material was evaluated in the following five grades:

⊚: Excellent. The surface of the injection-molded material was smooth and glossy.

○: Good. The surface of the injection-molded material was smooth but unglossy.

Δ: Acceptable. The surface of the injection-molded material was slightly rough but had no problem in practical use.

X: Bad. The surface of the injection-molded material was very rough and could not be put into practical use.

X X: Very bad. The thermoplastic elastomer composition could not be injection-molded.

(Paper-Feeding Test)

A paper-feeding roller composed of the rubber roller of each of the examples and the comparison examples was mounted on a printer (Seiko Epson EM900C.). Postcards were used as paper. A printing instruction was issued to rotate the paper-feeding roller to thereby feed the postcards at both a low temperature and a low humidity (10° C., relative humidity of 15%) in which it is difficult to feed the postcards and a normal temperature (23° C., relative humidity of 55%). The postcards were supplied to each rubber roller 5,000 times repeatedly to observe the paper-feeding performance (initial performance) thereof immediately after the paper-passing test started and its paper-feeding performance (durable performance (paper-feeding performance)) after 5,000 postcards were passed therethrough. The paper-feeding performance of each rubber roller was evaluated in the following four grades.

○: The postcard could be fed without problem in the paper-passing test conducted at 10° C. and relative humidity of 15%.

Δ: The postcard could be fed anyhow in the paper-passing test conducted at 10° C. and relative humidity of 15% (when the postcard shifted from the predetermined position, the postcard could not be fed or sometimes fed with two postcards superimposed on each other).

The postcard could be passed through the rubber roller without problem in the paper-passing test conducted at 23° C. and relative humidity of 55%.

X: The postcard could not be passed through the rubber roller in the paper-passing test conducted at 10° C. and relative humidity of 15%.

The postcard could be passed without problem through the rubber roller in the paper-passing test conducted at 23° C. and relative humidity of 55%.

X X: The postcard could not be passed through the rubber roller in the paper-passing test conducted at 23° C. and relative humidity of 55%.

(Durability Test)

Whether worn powder was generated was examined by the following method: The paper-feeding roller composed of the rubber roller of each of the examples and the comparison examples was mounted on a printer (Seiko Epson EM900C.). A printing instruction was issued to rotate the paper-feeding roller, without supplying the postcards thereto. After this operation was performed 40 times, ink jet recording paper (manufactured by Seiko Epson Corp., exclusive super-fine glossy paper) was passed through the paper-feeding roller to count the number of worn powders which attached to the recording paper. The number of worn powders of each of the examples and the comparison examples shown in the tables 1 and 2 is the mean value of the number of worn powders obtained from four paper-feeding rollers. Based on the mean value, the durability of each paper-feeding roller was evaluated in the following four grades:

⊚: Excellent. The number of worn powders (mean value) was less than two.

○: Good. The number of worn powders (mean value) was not less than 2 nor more than 6.

Δ: Acceptable. The number of worn powders (mean value) was not less than 6 nor more than 10.

X: Bad. The number of worn powders (mean value) was not less than 10.

The rubber roller of the comparison example 1 containing only the high-molecular-weight hydrogenated styrene TPE1 as the thermoplastic elastomer had a problem in its paper-passing performance and in particular in paper-feeding performance after much paper was passed through the rubber roller. The thermoplastic elastomer composition of the comparison example 2 containing much rubber had a low degree of moldability. The thermoplastic elastomer composition of the comparison example 3 containing a mixture of the resinous cross-linking agents 1 and 2 instead of one kind of resinous cross-linking agent had a low degree of durability.

The thermoplastic elastomer composition of the comparison example 4 containing much rubber component ([(A)+(C)]: [rubber component contained in (D)] is 10:90) could not be molded. Thus, no evaluation could be made. The thermoplastic elastomer composition of the comparison example 5 containing more softener (oil) than that of the other comparison examples had a little higher degree of moldability. The rubber roller could be made anyhow. But the surface of the rubber roller was bad and thus could not be put into practical use.

The thermoplastic elastomer composition of the comparison example 6 contained only the low-molecular-weight hydrogenated styrene TPE2 as the thermoplastic elastomer and an excessive amount of the rubber component. Thus the moldability of the thermoplastic elastomer composition was not good (moldability was lowest). Thus, the rubber roller of the comparison example 6 was unacceptable in its durability. The rubber roller of the comparison example 7 containing more low-molecular-weight hydrogenated styrene TPE2 than the rubber roller of the comparison example 6 had excellent moldability, whereas the rubber roller of the comparison example 7 was unacceptable in its durable performance (paper-feeding performance) and durability.

The rubber roller of the comparison example 8 containing only the high-molecular-weight hydrogenated styrene TPE2 as the thermoplastic elastomer was unacceptable in its durable performance (paper-feeding performance) and durability.

The rubber roller of the example 1 contained the high-molecular-weight hydrogenated styrene TPE1 and the low-molecular-weight hydrogenated styrene TPE2 (Mn1:Mn2=30.1:5.1). The weight ratio between [(A)+(C)] and [rubber component contained in (D)] was 45:55. The rubber roller of the example 1 was excellent in its moldability and durability. The rubber roller had high no problem in its paper-feeding performance at low temperatures and the normal temperature. It was confirmed that the rubber rollers of the examples 2–8 were also excellent in practical use. The rubber roller of the example 3 containing the rubber component at 85% could be put into practical use. That is, it was confirmed that the thermoplastic elastomer composition could contain an increased amount of rubber component.

The second embodiment of the present invention will be described below.

A cylindrical paper-feeding rubber roller is prepared by shaping a thermoplastic elastomer composed of the following components. A shaft is inserted into a hollow portion of the rubber roller by press fit or the shaft is bonded to the rubber roller.

The thermoplastic elastomer composition of the second embodiment consisting of a rubber composition contains:

(F) A thermoplastic elastomer containing a high-molecular-weight styrene thermoplastic elastomer having a number-average molecular weight not less than 80,000; and as necessary, a termination-unmodified low-molecular-weight styrene thermoplastic elastomer having a number-average molecular weight not less than 10,000 nor more than 70,000;

(G) A composition consisting of a polar termination-modified thermoplastic elastomer and/or a polar-nonpolar graft polymer;

(H) A rubber compound containing diene rubber such as EPDM as its main component; and (I) A resinous composition containing thermoplastic resin as its main component;

(J) A softener; and (K) A resinous cross-linking agent (and a cross-linking accelerator)

The rubber is dynamically cross-linked and dispersed in a mixture of a hydrogenated styrene thermoplastic elastomer and the thermoplastic resin.

As the high-molecular-weight hydrogenated styrene thermoplastic elastomer (F), SEEPS is used. As the low-molecular-weight hydrogenated styrene thermoplastic elastomer, SEPS is used.

As the polar termination-modified thermoplastic elastomer of the composition (G), SEEPS (one termination is modified into hydroxyl group) is used. As the polar-nonpolar graft polymer of the composition (G), polyethylene oxide graft polyethylene is used.

As the thermoplastic resin (I), polypropylene is used.

As the rubber compound (H), EPDM is used.

As the resinous cross-linking agent (K), phenol resinous cross-linking agent is used. Zinc oxide is used as the cross-linking activator.

Paraffin oil is used as the softener (J) used to adjust the hardness of the thermoplastic elastomer composition.

A thermoplastic elastomer composition containing the formulation described in tables 3 and 4 was prepared for each of examples 9–15 and comparison examples 9–13. Each thermoplastic elastomer composition was extrusion-molded cylindrically. The roller was cut to a predetermined size. A shaft was fitted into the roller to prepare a rubber roller.

TABLE 3

|  | E9 | E10 | E11 | E12 | E13 | E14 | E15 |
|---|---|---|---|---|---|---|---|
| Rubber | 55 | 55 | 55 | 55 | 55 | 55 | 55 |
| High-molecular-weight hydrogenated styrene TPE | 8.75 | 1.75 | 31.50 | 8.75 | 26.25 | 22.75 | 8.75 |
| Low-molecular-weight hydrogenated styrene TPE | 0 | 0 | 0 | 0 | 0 | 0 | 17.50 |
| Polar termination-modified hydrogenated styrene TPE | 26.25 | 33.25 | 3.50 | 26.25 | 0 | 3.50 | 0 |
| Polar-nonpolar graft compound | 0 | 0 | 0 | 0 | 8.75 | 8.75 | 8.75 |
| Thermoplastic resin | 10 | 10 | 10 | 10 | 10 | 10 | 10 |
| Softener 1 | 110 | 110 | 110 | 110 | 110 | 110 | 110 |
| Softener 2 | 0 | 0 | 0 | 0 | 0 | 0 | 0 |
| Resinous cross-linking agent 1 | 6.6 | 6.6 | 6.6 | 1.65 | 6.6 | 6.6 | 6.6 |
| Resinous cross-linking agent 2 | 0 | 0 | 0 | 4.95 | 0 | 0 | 0 |
| Cross-linking activator | 2.75 | 2.75 | 2.75 | 2.75 | 2.75 | 2.75 | 2.75 |
| Roller mark | ○ | ○ | Δ | ○ | Δ | ○ | ○ |
| Durability (generation of worn powder after 5000 sheets passed through roller) | ◎ | Δ | ○ | ○ | Δ | ○ | ○ |

Where "E" denotes example.

TABLE 4

|  | CE9 | CE10 | CE11 | CE12 | CE13 |
|---|---|---|---|---|---|
| Rubber | 55 | 55 | 55 | 55 | 55 |
| High-molecular-weight hydrogenated styrene TPE | 35 | 0 | 17.5 | 35 | 8.75 |
| Low-molecular-weight hydrogenated styrene TPE | 0 | 0 | 0 | 0 | 26.25 |
| Polar termination-modified hydrogenated styrene TPE | 0 | 35 | 0 | 0 | 0 |
| Polar-nonpolar graft compound | 0 | 0 | 17.5 | 0 | 0 |
| Thermoplastic resin | 10 | 10 | 10 | 10 | 10 |
| Softener 1 | 110 | 110 | 110 | 55 | 55 |
| Softener 2 | 0 | 0 | 0 | 55 | 55 |
| Resinous cross-linking agent 1 | 6.6 | 6.6 | 6.6 | 6.6 | 6.6 |
| Resinous cross-linking agent 2 | 0 | 0 | 0 | 0 | 0 |
| Cross-linking activator | 2.75 | 2.75 | 2.75 | 2.75 | 2.75 |
| Roller mark | X | ○ | X | X | X |
| Durability (generation of worn powder after 5000 sheets passed through roller) | ○ | X | X | ○ | ○ |

Where "CE" denotes comparison example.

The numerical values shown in the tables 3 and 4 indicate weight percentage. The abbreviation of TPE indicates thermoplastic elastomer.

Materials used are as follows:
EPDM (rubber): thermoplastic resin, cross-linking activator, a resinous cross-linking agent 1, and a resinous cross-linking agent 2 were similar to those of tables 1 and 2.
High-molecular-weight hydrogenated styrene TPE: SEEPS (Mn=300,000), produced by Kuraray Corp., Septon 4077
Low-molecular-weight hydrogenated styrene TPE: SEPS (Mn=51,000), produced by Kuraray Corp., Septon 2002
Termination-modified hydrogenated styrene TPE: SEEPS (one termination was modified into hydroxyl group) (Mn=54,000, Mw=60,000), produced by Kuraray Corp., Septon HG252
Polar-nonpolar graft polymer (polar-nonpolar graft compound): polyethylene oxide graft polyethylene, produced by Sumitomo Chemical Corp., Sumiguard 300G
Softener 1: paraffin oil (nonpolar oil), produced by Idemitsu Kosan Corp., Diana process oil PW-380
Softener 2: maleic acid-modified paraffin oil (polar oil), produced by Mitsui Chemical Corp., Lucant A-6002

The rubber roller was prepared by the following method. Except that the kneading temperature and the cross-linking temperature were 160° C.–220° C. respectively, the rubber composition was extruded by a method similar to that of the first embodiment (examples 1–8, comparison examples 1–8). Then, the kneaded rubber composition was shaped into a pellet. The pelletlike rubber composition was extruded tubularly. Thereafter, the molded rubber composition was cut to a required size. In this manner, the rubber roller having an outer diameter of 30 mm, an inner diameter of 25 mm, and a width of 15 mm was prepared.

EXAMPLES 9–15

The thermoplastic elastomer composition of each of the examples 9–15 was formed by mixing each of the following components at the mixing ratio shown in the table 3, and rubber of each mixture was dynamically cross-linked and dispersed uniformly:

(F) A thermoplastic elastomer containing a high-molecular-weight styrene thermoplastic elastomer having a number-average molecular weight not less than 80,000 and as necessary, a termination-unmodified low-molecular-weight styrene thermoplastic elastomer having a number-average molecular weight not less than 10,000 nor more than 70,000;

(G) A composition consisting of a polar termination-modified thermoplastic elastomer and/or a polar-nonpolar graft polymer;

(H) A rubber compound containing diene rubber such as EPDM as its main component;

(I) Thermoplastic resin;

(J) A softener; and (K) A resinous cross-linking agent and a cross-linking activator

COMPARISON EXAMPLES 9–13

As shown in table 4, the mixing ratios of the components of the thermoplastic elastomer composition of the comparison examples 9–13 were different from one another except the thermoplastic resin, the resinous cross-linking agent, and the cross-linking activator.

COMPARISON EXAMPLE 9

The thermoplastic elastomer composition contained the high-molecular-weight hydrogenated styrene TPE. Paraffin oil was used as the softener. The thermoplastic elastomer composition did not contain the termination-modified or termination-unmodified low-molecular-weight styrene thermoplastic elastomer having a number-average molecular weight of composition (G) and (F) not less than 10,000 nor more than 70,000.

COMPARISON EXAMPLE 10

Polar termination-modified hydrogenated styrene TPE was used. Paraffin oil was used as the softener. High-molecular-weight styrene TPE having a number-average molecular weight of not less than 80,000 was not used.

COMPARISON EXAMPLE 11

The high-molecular-weight hydrogenated styrene TPE of (F), the polar-nonpolar graft polymer of (G) (polar-nonpolar graft compound), and the paraffin oil serving as the softener (J) were used.

The weight percentage of the polar-nonpolar graft polymer of (G) (polar-nonpolar graft compound) was 17.5 which was more than the specified range.

COMPARISON EXAMPLE 12

As the softener other than the softener contained in the oil-extended rubber (Esprene 670F), maleic acid-modified paraffin oil (polar oil) was used. The component (G) was not used.

COMPARISON EXAMPLE 13

The high-molecular-weight hydrogenated styrene TPE of (F) and low-molecular-weight hydrogenated styrene TPE were used. As the softener other than the softener contained in the oil-extended rubber (Esprene 670F), maleic acid-modified paraffin oil (polar oil) was used. The component (G) was not used.

The rubber roller of each of the examples 9–15 and the comparison examples 9–13 was examined on the generation of worn powder (durability test) and whether a roller mark was formed on paper. Tables 3 and 4 show evaluated results.

(Durability Test)

Whether worn powder was generated was examined by the following method: The paper-feeding roller composed of the rubber roller of each of the examples and the comparison examples was mounted on a printer (Seiko Epson PM-770C). With paper (produced by Fuji Xerox Corp., PPC paper) set on a feeder, printing instructions were repeatedly issued to pass 5000 sheets of the paper through the paper-feeding roller. Thereafter, ink jet recording paper (manufactured by Seiko Epson, exclusive super-fine glossy paper in the trade name of MJA4SP3) was passed through the paper-feeding roller to count the number of worn powders which attached to the recording paper. The number of worn powders of each of the examples and the comparison examples shown in the tables 3 and 4 is the mean value of the number of worn powders obtained from two paper-feeding rollers. Based on the mean value, the durability of each paper-feeding roller was evaluated in the following four grades:

⊚: Excellent. The number of worn powders (mean value) was less than 2.

○: Good. The number of worn powder was not less than 2 nor more than 6.

Δ: Acceptable. The number of worn powder was not less than 6 nor more than 10.

X: Bad. The number of worn powder was not less than 10.

(Evaluation of Roller Mark)

After the rubber roller of each of the examples and the comparison examples was cut to a width of 14.65±0.15 mm, each rubber roller was cleaned and left at 60° C. for two hours. Thereafter, the rubber roller was set on a printer manufactured by Seiko Epson, PM-770C. As the printing paper, exclusive super-fine glossy paper, MJA4SP3 manufactured by Seiko Epson Corp. was used. With the rubber roller, the printing paper, ink set, a printing instruction of solid blue was issued by setting the printing mode to a super-fine image quality mode. Each printed image was evaluated in the following three grades:

○: No roller mark was observed.

Δ: Slight roller mark was observed but the rubber roller could be used in a printer not of high quality.

X: A roller mark was observed clearly and could not be put into practical use.

The rubber roller of the comparison example 9 containing the high-molecular-weight termination-unmodified hydrogenated styrene TPE had a distinct roller mark. Thus, the rubber roller could not be put to practical use. The rubber roller of the comparison example 10 containing the termination-modified hydrogenated styrene TPE was bad in its durability. The rubber roller of the comparison example 11 containing much polar-nonpolar graft polymer was bad in its durability. The rubber roller formed a clear roller mark on the paper. Thus the rubber roller could not be put to practical use. The rubber roller of the comparison example 12 containing the polar oil as the softener formed a clear roller mark on the paper. Thus the rubber roller could not be put to practical use. This is because the addition of the polar oil to the nonpolar rubber or resin deteriorates the compatibility of the oil with the rubber as well as the resin. Similarly to the comparison example 12, the rubber roller of the comparison example 13 containing the mixture of the high-molecular-weight hydrogenated styrene TPE and the low-molecular-weight hydrogenated styrene TPE and the polar oil as the softener formed a distinct roller mark on the paper. Thus the rubber roller could not be put to practical use. Thus the rubber roller could not be put to practical use.

The rubber roller of the example 9 containing the high-molecular-weight hydrogenated styrene TPE of the component (F) and the termination-modified hydrogenated styrene TPE in such a way that the weight ratio between the component (F) and the component (G) is 1:3 had a high degree of moldability and durability and formed no roller marks on the paper. That is, the rubber roller had excellent performance. It was confirmed that the rubber roller of each of the examples 10–15 was also excellent in its performance and could be put to practical use.

As apparent from the foregoing description, according to one thermoplastic elastomer composition of the present invention, the rubber is dynamically cross-linked and dispersed in the mixture of the thermoplastic elastomer and the thermoplastic resin. As the thermoplastic elastomer, the affinitive high-molecular-weight thermoplastic elastomer and the affinitive low-molecular-weight thermoplastic elastomer are used in combination in such a way that the ratio of the number-average molecular weight of the high-molecular-weight thermoplastic elastomer to that of the low-molecular-weight thermoplastic elastomer (Mn1/Mn2)

is set to not less than 1.2 nor more than 500. The thermoplastic elastomer composition thus formed has a high degree of moldability and ensures a high degree of flexibility and wear resistance-durability. Further, it is possible to add larger amount of the rubber to the thermoplastic elastomer.

According to another thermoplastic elastomer composition of the present invention, the rubber is dynamically cross-linked and dispersed in the styrene thermoplastic elastomer. The thermoplastic elastomer composition consists of the thermoplastic elastomer containing the high-molecular-weight styrene thermoplastic elastomer essentially; and the low-molecular-weight styrene thermoplastic elastomer as necessary; the polymer consisting of the polar termination-modified thermoplastic elastomer and/or the polar-nonpolar graft polymer; the softener; the thermoplastic resin; and the rubber containing EPDM as its main component. The thermoplastic elastomer composition thus formed has a high degree of moldability and ensures a high degree of flexibility and wear resistance-durability. In addition, the thermoplastic elastomer composition is compatible with the polar recording liquid such as aqueous ink.

The paper-feeding roller formed by shaping the thermoplastic elastomer composition of the present invention is very useful for the ink jet printer and the like required to feed paper or a film by picking it up and separating it from other paper or films. The paper-feeding roller allows a high-quality printer form a favorable image on super-fine glossy paper, photo-printing paper, and color OHP paper without form a roller mark thereon.

What is claimed is:

1. A thermoplastic elastomer composition consisting of a mixture of:
   a thermoplastic elastomer composition (F) containing a high-molecular-weight styrene thermoplastic elastomer having a number-average molecular weight not less than 80,000;
   a composition (G) consisting of a polar termination-modified thermoplastic elastomer and/or a polar-nonpolar graft polymer, and
   a rubber compound (H) containing at least 50 wt % of EPDM,
   wherein a rubber component of the mixture is dynamically cross-linked and dispersed in the thermoplastic elastomer.

2. The thermoplastic elastomer composition according to claim 1, wherein the thermoplastic elastomer composition (F) contains:
   a termination-unmodified low-molecular-weight styrene thermoplastic elastomer having a number-average molecular weight not more than 70,000; and
   not more than 600 wt % of oil with respect to 100 wt % of rubber contained in the rubber compound (H);
   a mixture of the thermoplastic elastomer composition (F), the composition (G), and the rubber compound (H) contains:
      a resinous composition (I), containing thermoplastic resin as a main component thereof, not more than 50 wt % with respect to 100 wt % of the rubber component contained in the rubber compound (H);
      a softener (J) not more than 500 wt % with respect to 100 wt % of the rubber component contained in the rubber compound (H); and
      a resinous cross-linking agent (K).

3. The thermoplastic elastomer composition according to claim 1, wherein a weight ratio between the styrene thermoplastic elastomer of the thermoplastic elastomer composition (F) and the composition (G) is set to 95:5–1:99.

4. The thermoplastic elastomer composition according to claim 1, wherein a weight ratio of the polar-nonpolar graft polymer of the composition (G) to an entire polymer contained in the mixture is not less than 3 nor more than 15, supposing that a weight of each of a softener, a cross-linking agent, a processing aid, and zinc white is excluded.

5. A rubber roller formed by cylindrically shaping the thermoplastic elastomer composition according to claim 1.

6. The rubber roller according to claim 5, which is used as a paper-feeding roller of ink jet printer.

* * * * *